Oct. 22, 1940.  C. A. COHEN ET AL  2,218,981
MANUFACTURE OF CHLORHYDRINS
Filed Nov. 24, 1937
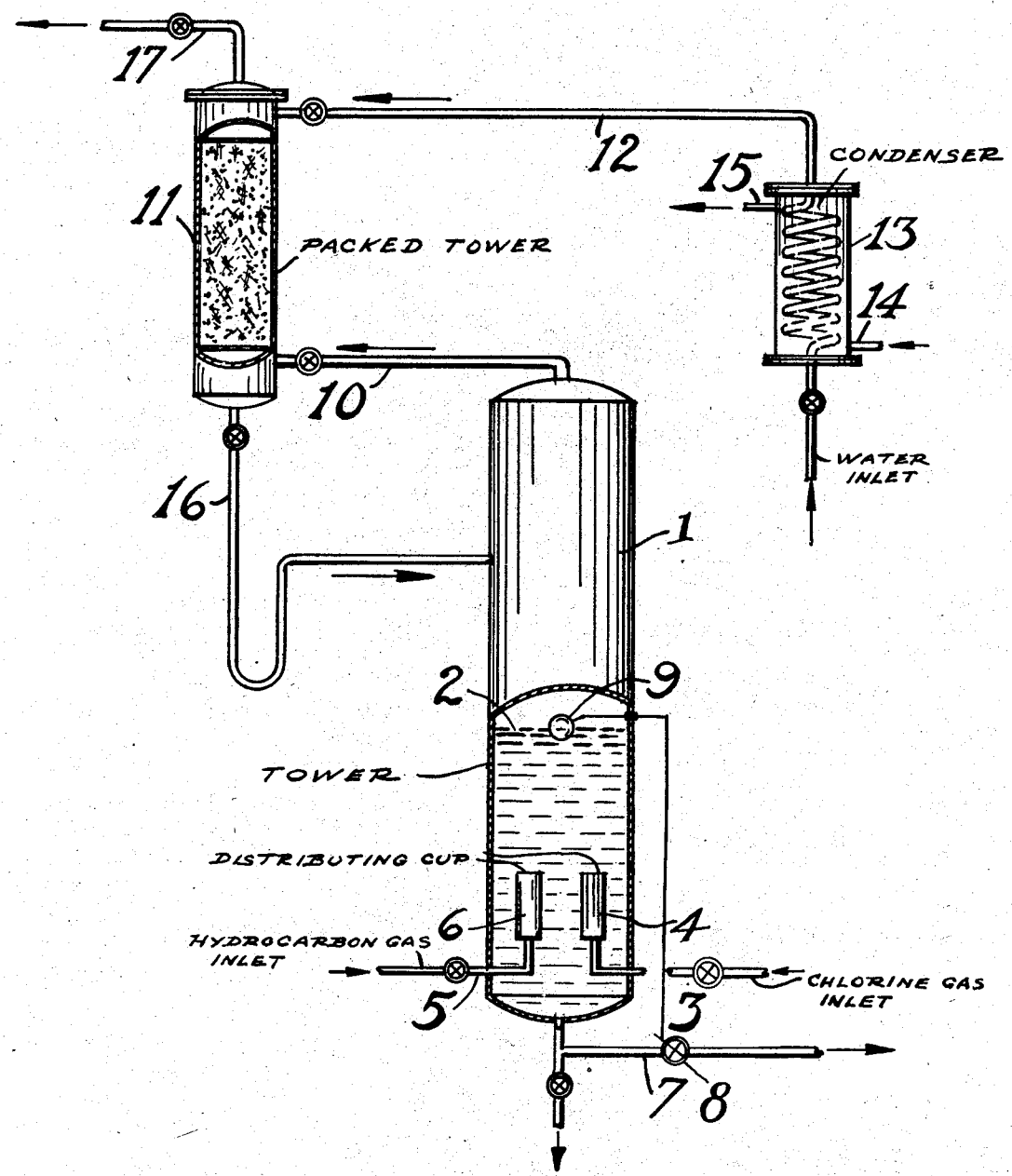
Charles A. Cohen
Clayton M. Beamer  Inventors
By W. E. Currie  Attorney Patented Oct. 22, 1940

2,218,981

UNITED STATES PATENT OFFICE 2,218,981

MANUFACTURE OF CHLORHYDRINS

Charles A. Cohen, Elizabeth, and Clayton M. Beamer, Roselle, N. J., assignors to Standard Alcohol Co.

Application November 24, 1937, Serial No. 176,167

7 Claims. (Cl. 260—634)

This invention relates to processes of making chlorhydrins and relates particularly to a process of producing chlorhydrins from gaseous mixtures containing an olefine and saturated hydrocarbons with a minimum loss to side reactions.

The chlorhydrins produced from the gaseous olefines, such as ethylene, propylene and butylene, are thin mobile liquids more or less soluble in water. When dry and pure, they have boiling points higher than that of water, but in the presence of water their boiling points are below 100° C. Olefine chlorides and chlorhydrins may both or either be formed, depending upon the amount of water present during the reaction. In the presence of relatively large bodies of water, chlorhydrins are generally formed, but due to the presence of the said water, substantial amounts of chlorhydrins are mechanically carried over when a gas containing relatively small portions of olefines is used as the starting material for preparing the chlorhydrins.

An object of this invention is to provide a method in which relatively dilute olefine solutions are so treated that substantially all of the olefine is recovered as a chlorhydrin. This and other objects of the invention will be more clearly understood on reading the following description with reference to the drawing.

A tower designated by numeral 1 is partly filled with water to the level 2. Into this tower is passed chlorine gas through inlet 3 and distributing cup 4. Through pipe 5 and distributing cup 6 is passed a hydrocarbon gas containing from 10 to 50% or more of olefines. Other suitable means of distributing the two gases in the lower part of tower 1 may be used. A bottom outlet 7 is provided to remove the aqueous solution of the product formed by reacting the chlorine and hydrocarbon gas. This pipe 7 is provided with a valve 8. The level of the aqueous solution in tower 1 is regulated by the opening or closing of valve 8 which is operatively connected with and actuated by float 9.

The olefines, on reacting with the chlorine in the presence of water, form chlorhydrins. The said chlorhydrins form an emulsion in the water and a substantial quantity of foam. The spent gas, in passing from tower 1 to pipe 10, mechanically carries over some of the chlorhydrins and is passed into a packed tower 11. Into this packed tower water is passed through pipe 12, which water is previously cooled by passing through exchanger 13, said exchanger 13 being provided with an inlet 14 and outlet 15 for a cooling solution, such as brine. The water is cooled sufficiently so that, after passing in countercurrent to the gas passing upwardly in the packed tower 11, it will absorb the chlorhydrins and leave the tower 11 at a temperature from about 5° to 10° C. through pipe 16, the spent gas being removed from the system through pipe 17.

By means of this process, substantially all of the olefine in the hydrocarbon mixture is converted to reaction products, the residual spent hydrocarbon gas leaving the system through pipe 17, being free of reactants and effecting a complete recovery of reaction products. The temperatures are controlled and maintained at 10° to 80° C. in tower 1, depending on the olefine concentration and product desired. By the circulation of the water through the system, a concentration of hydrochloric acid in tower 1 is also maintained at a low degree and, therefore, substantially no olefine chlorides are formed. This is a closed system and reaction is carried out in tower 1 free of any substantial illumination. If desired, the mixture of hydrocarbon gases which had been prepared by cracking or subjecting petroleum oils to temperatures of 400° to 900° C. are first fractionated to remove the higher boiling constituents and then treated with sulfuric acid of about 60–70% concentration to remove the iso-olefines. If desired, to prepare pure ethylene chlorhydrin, propylene and butylene may be first removed by contacting the gas with 80–98% sulfuric acid at suitable temperatures of between 15 and 40° C. and then using the residual gas according to this process.

The invention is not to be limited to the specific embodiments nor to any theories advanced as to the operation of the invention, but in the appended claims it is intended to claim all inherent novelty in the invention as broadly as the prior art permits.

We claim:

1. The process of making chlorhydrins from a mixture of gaseous hydrocarbons containing olefines and paraffins, which comprises passing a mixture of olefines and paraffin hydrocarbons and chlorine upwardly through a body of water maintained at a temperature not above 80° C., washing the spent gas with water cooled to a temperature not over 10° C., conducting the wash water with the chlorhydrins in solution to the first said body of water where it is contacted with chlorine and olefines and continuously separating an aqueous solution of chlorhydrins.

2. The process of making chlorhydrins, which comprises passing chlorine and a gaseous mixture of olefine and paraffin hydrocarbons in concurrent flow through a body of water, passing the spent gas in countercurrent flow through water which is cooled to a temperature not over 10° C., passing the cooled water continuously into the first said body of water and continuously withdrawing from said body of water an aqueous solution of chlorhydrins.

3. The process of making chlorhydrins, which comprises contacting a gaseous mixture of olefines and paraffin hydrocarbons with sulfuric acid of 60-70% concentration at a temperature within the range of between 15 and 40° C., then passing the hydrocarbons through a body of water concurrently with chlorine gas, passing the spent gas in countercurrent flow to water cooled to a temperature not over 10° C., passing the cooled water in countercurrent flow to the chlorine and the said hydrocarbons and separating an aqueous solution of chlorhydrins.

4. The process of making ethylene chlorhydrin, which comprises contacting a gaseous mixture of olefines and paraffin hydrocarbons with sulfuric acid of 80-98% concentration at a temperature within the range of 15 to 40° C., then passing the hydrocarbons through a body of water concurrently with chlorine gas, passing the spent gas in countercurrent flow to water cooled to a temperature not over 10° C., passing the cooled water in countercurrent flow to the chlorine and the said hydrocarbons and separating an aqueous solution of ethylene chlorhydrin.

5. The process of making chlorhydrins, which comprises contacting olefines and chlorine in the presence of water at a temperature not above 200° C., washing the spent gas with water cooled to a temperature not over 10° C., conducting the wash water with chlorhydrins in solution to contact with chlorine and olefine and continuously separating an aqueous solution of chlorhydrins.

6. The process of making chlorhydrins from a mixture of gaseous hydrocarbons containing olefins and paraffins, which comprises contacting a mixture of olefin and paraffin hydrocarbons with chlorine in the presence of a body of water at a temperature not above 80° C., continuously adding water cooled to a temperature not over 10° C. which has been used to absorb entrained chlorhydrins from the spent gas, to said body of water, and continuously separating an aqueous solution of chlorhydrins.

7. The process of making chlorhydrins from a mixture of gaseous hydrocarbons containing olefins and paraffins, which comprises the step of adding to an aqueous solution in which the chlorine and mixture of olefin and paraffin hydrocarbons are contacted at a temperature not above 80° C., a stream of water cooled to a temperature not over 10° C. which has been used to absorb entrained chlorhydrins from the spent gas, and continuously separating an aqueous solution of chlorhydrins.

CHARLES A. COHEN.
CLAYTON M. BEAMER.